United States Patent Office 3,362,820

Patented Jan. 9, 1968

3,362,820

COLOR MASKING PROCEDURE AND MATERIALS THEREFOR

Ehrhard Hellmig, Leverkusen, Germany, assignor to General Aniline & Film Corporation, New York, N.Y., a corporation of Delaware No Drawing. Filed Aug. 8, 1962, Ser. No. 215,500
2 Claims. (Cl. 96—9)

This invention relates to an improved masking process for the color correction of color separations and of duplicate color prints.

In the preparation of color reproductions from original color prints or color transparencies, correction masks are frequently employed. These masks are photographic pictures which are copied from the original copy. When these masks have been finished, they are again combined with the original. The combination of the original color copy and the mask forms then a new and modified color copy which is used in the customary manner to make color corrected color separations or copies.

It is known that the simplest masking procedure involves the preparation of a black and white mask from the original color copy. This mask has a gradation of approximately 0.4 and is combined with the original color copy in the preparation of the color separations or in the preparation of new copies. Compared with the original color copy, this mask has a gradation which runs in the opposite direction. The black and white mask is formed in a panchromatically sensitized silver halide emulsion layer which is exposed either through a very pale yellow filter or without a filter.

This procedure is very simple as far as the preparation and the use of the mask is concerned, because the latter does not have to be changed during the copying procedure. However, the results obtained are not of optimum quality. Considering the fact the masking image is made up of neutral gray silver, it becomes obvious that the action of the mask will be the same with blue, green and red light used in the exposure of the yellow, magneta and cyan separations. This uniformity causes an incomplete color correction in the color separations, because it is well established that the mask for the cyan separation must be considerably flatter than those for the yellow or magenta preparation. As a consequence, the known silver masking procedure results in an over correction of the cyan separation or in an under correction in the yellow or magenta separation. Frequently, both defects occur simultaneously.

It is accordingly an object of this invention to provide an improved procedure for the preparation of color corrected color separations. Other objects will be apparent from the following description.

It has now been found that these disadvantages can be overcome if the color corrected color separations or color duplicates of the original color copies are prepared by means of an orange colored mask which had been copied from the original color copy by the use of yellow light.

A preferred modification of this invention uses an orange colored mask which, in addition, contains a certain content of gray. Such a mask absorbs not only in the blue and green portion of the spectrum, but also to a lesser extent in the red portion of the spectrum; preferably the red absorption is only half of the other two absorptions.

Such a mask is readily prepared by the modifications of known techniques. For instance, a photographic film is used which carries on a suitable film support a panchromatically sensitized gelatin silver halide emulsion layer which contains two color couplers; one coupler yields upon color development, a yellow dye image, while the second coupler yields a magenta dye image. The colored original, for instance, a multi-layer material in which a multicolored reversal image had been formed by color development, is copied onto this panchromatic film by exposure with yellow light. The exposed masking film is then developed conventionally with a color developer to a combined dye and silver image which is subsequently fixed but not bleached. The masking image thus obtained consists of a combination of an orange dye image and a silver image. This mask is then combined in the customary manner with the original color copy and the color separations printed without changing the masks.

The gradation of the mask in the three spectral regions, namely blue, green and red, depends, as in all masking procedures, on the optical properties (secondary color densities) of the original color copies. It also depends on the characteristics of the image dyes whenever the original is a color transparency or a color negative. The gradation of the mask depends further on the optical properties or characteristics of the inks which are used in the eventual printing of the final reproduction. Finally, the gradation of the mask depends on the image dyes used in the final copying material, if a photographic color printing procedure is used. When printing inks as defined by German Standards DIN 16508 and 161509 are used, the gradation of the mask must be as follows:

| | |
|---|---|
| Blue spectral region | 0.6 |
| Green spectral region | 0.4 |
| Red spectral region | 0.2 |

These figures represent average values and depend on the image dyes of the colored originals which may be transparencies prepared from the color film of different manufacturers. The above figures can be changed within reasonable limits.

This single mask accomplishes a surprisingly far reaching and nearly perfect color correction. This improvement will be appreciated if it is taken into consideration that that mask which had been exposed with yellow light contains actually two masks, because the yellow light is composed of green and yellow light. Consequently, the mask prepared with yellow light represents two masks; one which had been prepared with green light and another one which had been prepared with red light.

The grayish orange color of the mask absorbs in each of the three spectral regions and thus effects the blue, green and red filter of a partial image. Considering that each of the two masks contains three separate masks, it will be apparent that the masks of this invention represents six individual masks. The effect of these masks is illustrated by the following diagram which indicates the possible existence of nine masks.

IMAGE DYES

| Filter | Y | M | C |
|---|---|---|---|
| *b* | | X | X |
| *g* | | ⊗ | X |
| *r* | | X | ⊗ |

In this diagram, Y, M, and C represents the yellow, magenta and cyan dye image; *b*, *g*, and *r* represents the color of the image light, namely, blue, green, and red. The symbol X indicates the existence of an image mask, whereas the symbol ⊗ illustrates masks which serve only to the lower gradation. The latter type of mask is sometimes identified as a false mask.

It will be noted that the mask leads to a complete correction of the optical imperfections (secondary color densities) of the magenta and cyan dies. The yellow dye is not corrected, since it is known that these dyes are optically nearly perfect and rarely requires any color correction. The secondary densities of yellow, when illuminated with red light, are practically zero and at best minute with green light. In the event that it becomes necessary to correct this minute secondary green density, it is possible to do so by combining the mask of this invention with a second mask. The latter is prepared by exposure with blue light and its color can be purple, magenta, red or even a neutral gray. The gray mask may be a silver mask with a very low density which need not exceed 0.15. The combined use of these two masks results in a theoretically ideal mask, but it must be kept in mind that a mask which is nearly perfect can be achieved by the use of the orange-gray mask alone.

In the preparation of the additional mask, a material is used which carries on a suitable film support a blue sensitive silver halide emulsion layer which contains a suitable coupler or mixture of couplers capable of forming purple, magenta or red dye images by color development. In a prefered modification of this invention, the two masks may be arranged on one and the same film support. These combined masks are obtained by the use of a film which contains a blue sensitive silver halide layer in combination with a panchromatically sensitized silver halide layer. These two emusions layers are separated by a yellow filter. For practical reasons, it is best to arrange the two emulsion layers on opposite sides of the support. The yellow filter layer is placed either between the support or the blue sensitive emulsion layer or between the panchromatically sensitive emulsion layer and the support. The blue senistive emulsion layer may contain coupler for the formation of purple, magenta or red dye images but it may also be entirely free from couplers. The panchromatic emulsion layer contains the previously described couplers for the formation of an orange or orange-gray colored dye image. Exposure of this material is carried out with white light and the masking material is arranged in such a way that the blue sensitive emulsion layer faces the original color copy.

A color correction of the yellow and magenta separations can also be accomplished if the gradations or gamma of the mask in the red region of the spectrum is not even 0.2, as shown above, but actually zero. In this case, the cyan separation remains unmasked, as frequently done in the known procedures. In this case, the masking dye is not a grayish orange, but a pure orange. This pure orange dye image can be obtained with the above described masking material by removing the silver image in the customary manner by bleaching with a potassium ferricyanide solution and subsequent fixing. It is also possible to remove the silver by use of one of the commercially available combined bleaching and fixing solutions. It is further possible to remove the silver image only partially so that the characteristic of the mask can be varied as needed after processing and adjusted to specific needs.

It is, of course, also possible to develop this lightsenstive material in a conventional black and white developer to form a pure silver image. This modification may be helpful with certain masking procedures in which the masks must be changed. It is, therefore, apparent that the new material is not only suitable for the purposes of this invention, but also to improve previously known procedures.

A further simplification in the use of the described material can be achieved by combining with the masking material, the yellow filter which is needed for the exposure to yellow light. This can be accomplished by providing the masking material with a suitable colored layer which bleaches during photographic processing. It is further possible to color the silver halide material with a suitable dye which bleaches during photographic processing. In a preferred form, the yellow filter layer is either coated onto the support on the side opposite the emulsion layer, or can be placed between the support and the light-sensitive silver halide emulsion layer. When this arrangement is used, the masking emulsion must be exposed in such a way that the carrier faces the original color copy and the silver halide emulsion faces in the opposite direction. In this way, two advantages are gained. No special filter is necessary for the exposure of the mask, thus simplifying not only the use of the material but also avoiding deficiencies in the reproduction which may be caused by dispersed light, scratches and fingerprints on the filter. Moreover, the presence of the filter layer in the film does not interfere with the abovementioned conventional use of material because its spectral sensitivity can be fully maintained by rearranging the film during exposure in such a way that the emulsion side faces the original color copy.

The invention lends itself to various modifications. For instance, it is not necessary that the colored mask be produced by color development with an aromatic amino developing agent. Actually, any suitable color process may be used such as the toning of black and white silver images, the coloring of a gelatin relief image (Pinatype), the mordant process and others. Moreover, the material can be combined in a known manner with light diffusing materials to obtain unsharp masking. It is further possible to provide the material with an anti-Newton layer or one or more matting layers to permit re-touching by hand. As mentioned above, the novel mask can be combined with additional color correction masks or if desired, with one or more density correcting masks such as high-light masks or heavy shadow masks.

Preferably, but not necessarily, the color of the filter layer is a sharp cutting yellow. The latter does not transmit any light from the blue spectral region. However, it must be kept in mind that the color of the filter is, to a certain degree, influenced by the inherent spectral sensitivity of the panchromatic emulsion layer. Under certain conditions, the color of the yellow exposure light may be slightly on the orange side of even greenish. Fortunately, the masking procedure, and this has been demonstrated by thorough investigations, is not critically dependent on the color of the copying light so that the spectral quality of the exposure light, for instance, that of an incandescant light, need not be thoroughly standardized.

It has already been mentioned above that the described masking material is not only valuable for the preparation of color corrected separations for the graphic art, but also for the reproduction of negative and positive materials and even for the preparation of duplicate transparencies which may be of the reversal or negative type. In this connection, it should be kept in mind that the color mask leads to unequal gradations upon illumination with blue, green and red light. However, this deficiency can be eliminated or cancelled out by making suitable selections in the choice of the material and its processing. When making color separations, this can be done by a suitable development or selection of materials. In the preparation of color copies, this deficiency can be eliminated by a suitable choice of a multi-layer material, having individual layers of different gradations. It will be appreciated that various modifications may be made in the products and procedures described herein without in any way deviating from the scope of the invention, as defined in the following claims.

I claim:

1. In the process of preparing color corrected color copies from an original color copy by the use of a color correction mask which comprises forming such a mask by exposing a photographic material carrying on a suitable support a light-sensitive silver halide emulsion which is panchromatically sensitized and contains a color former fast to diffusion capable of reacting with the reaction products of an aromatic p-amino developing agent to form an orange dye image, with yellow light to the original color copy and converting the latent image formed in the silver halide emulsion layer into an orange color mask by developing the so-exposed material with an aromatic p-amino developing agent so as to form an orange dye image in situ with a silver image, fixing the residual halide, while omitting the step of bleaching the silver image, so as to obtain an orange color mask which is modified by a substantial content of gray.

2. In the process of preparing color corrected color copies for an original color copy by the use of a color correction mask which comprises forming such a mask by exposing to the original color copy with white light a photographic material carrying on a suitable support a light-sensitive silver halide emulsion which is panchromatically sensitized and contains a color former fast to diffusion capable of reacting with the reaction products of an aromatic p-amino developing agent to form an orange dye image, said support carrying in addition to the panchromatically silver halide emulsion layer, on the opposite side of the support, a blue-sensitive silver halide emulsion layer which contains at least one color component fast to diffusion capable of reacting with the reaction products of an aromatic p-amino developing agent to form a purple to red color image, said photographic material carrying between the support and at least one of said emulsion layers a yellow filter layer containing a yellow coloring agent which is capable of being discharged during processing, said exposure with white light being carried out in such a manner that the blue-sensitive layer faces the original color copy, and converting the latent image formed in the panchromatic silver halide emulsion layer into an orange color mask and converting the latent image formed in the blue-sensitive silver halide layer to form a purple to red mask, by developing the so-exposed material with an aromatic p-amino developing agent so as to form an orange dye image in the panchromatic layer and a purple to red dye image in the blue-sensitive layer.

References Cited

UNITED STATES PATENTS

| | | | |
|---|---|---|---|
| 2,005,970 | 6/1935 | Dieterich | 96—84 |
| 2,294,981 | 9/1942 | Hanson | 96—6 |
| 2,760,862 | 8/1956 | Harsh | 96—6 |
| 2,347,119 | 4/1944 | Michaelis | 96—8 |
| 2,423,465 | 7/1947 | Murray | 96—69 |
| 2,596,677 | 5/1952 | Gosling et al. | 96—67 |
| 1,897,846 | 2/1933 | Kelly | 96—69 |
| 2,010,459 | 8/1935 | Mannes et al. | 96—69 |
| 2,218,229 | 10/1940 | Carroll et al. | 96—69 |

NORMAN G. TORCHIN, *Primary Examiner.*

J. T. BROWN, *Assistant Examiner.*

Disclaimer 3,362,820.—*Ehrhard Hellmig,* Leverkusen, Germany. COLOR MASKING PROCEDURE AND MATERIALS THEREFOR. Patent dated Jan. 9, 1968. Disclaimer filed Sept. 30, 1982, by the assignee, *Eastman Kodak Co.*

Hereby enters this disclaimer to all claims of said patent.

[*Official Gazette March 1, 1983.*]